United States Patent
Hsia et al.

(10) Patent No.: US 10,381,616 B2
(45) Date of Patent: Aug. 13, 2019

(54) MULTIPLEXED BATTERY SET AND BATTERY ASSEMBLY HAVING THE MULTIPLEXED BATTERY SET

(71) Applicant: J. D COMPONENTS CO., LTD., Chang Hua Hsien (TW)

(72) Inventors: Wei-Tse Hsia, Chang Hua Hsien (TW); Chia-Chuan Lin, Chang Hua Hsien (TW)

(73) Assignee: J. D. Components Co., Ltd., Chang Hua Hsien (TW)

( * ) Notice: Subject to any disclaimer, the term of this patent is extended or adjusted under 35 U.S.C. 154(b) by 192 days.

(21) Appl. No.: 15/496,579

(22) Filed: Apr. 25, 2017

(65) Prior Publication Data
US 2017/0309874 A1    Oct. 26, 2017

(30) Foreign Application Priority Data

Apr. 25, 2016  (TW) ............................. 105112817 A
Jul. 4, 2016   (TW) ............................. 105210044 U
Jul. 5, 2016   (TW) ............................. 105210128 U

(51) Int. Cl.
*H01M 2/10*     (2006.01)
*H01M 2/20*     (2006.01)
(Continued)

(52) U.S. Cl.
CPC .......... *H01M 2/1077* (2013.01); *B60L 50/64* (2019.02); *B60L 50/66* (2019.02); *B62K 19/30* (2013.01); *B62M 6/90* (2013.01); *H01M 2/1083* (2013.01); *H01M 2/206* (2013.01); *B60L 2200/16* (2013.01); *B60L 2200/24* (2013.01);
(Continued)

(58) Field of Classification Search
CPC .. H01M 2/1077; H01M 2/1083; H01M 2/206; H01M 2220/20; B60L 11/1879; B60L 11/1877; B60L 2200/24; B60L 2200/16; B62K 19/30
See application file for complete search history.

(56) References Cited

U.S. PATENT DOCUMENTS 5,256,954 A * 10/1993 Chen ..................... H02J 7/0045
                                                       320/110
5,853,915 A * 12/1998 Suto .................... H01M 2/1061
                                                        429/99
(Continued)

FOREIGN PATENT DOCUMENTS

DE   102010000740 A1   7/2011
EP        2134592 B1   2/2013
EP        2653371 A1   10/2013

*Primary Examiner* — Edu E. Enin-Okut
(74) *Attorney, Agent, or Firm* — Muncy, Geissler, Olds & Lowe, P.C.

(57) ABSTRACT

A multiplexed battery set includes a plurality of battery units connected in series in such a manner that the battery units are bendable at connection positions, each of which is between each adjacent two of the battery units. Each battery unit includes a plurality of contacts. The battery set further includes a plurality of electrical wires respectively electrically connected between the contacts of each adjacent two battery units to electrically connect the battery units in series. The electrical wires has a length capable for keeping battery units in an electrically connected status when each adjacent two battery units are bent by an external force.

2 Claims, 19 Drawing Sheets

(51) Int. Cl.
  *B60L 50/60*   (2019.01)
  *B60L 50/64*   (2019.01)
  *B62K 19/30*   (2006.01)
  *B62M 6/90*    (2010.01)
  *B62K 3/00*    (2006.01)
  *B62K 11/00*   (2006.01)

(52) U.S. Cl.
  CPC ............. *B62K 3/002* (2013.01); *B62K 11/007* (2016.11); *H01M 2220/20* (2013.01); *Y02T 10/7005* (2013.01); *Y02T 10/705* (2013.01)

(56) References Cited

U.S. PATENT DOCUMENTS 7,869,199 B2 * 1/2011 Huang ................ H01M 2/1066
                                                  361/679.01
8,881,857 B2 * 11/2014 Binggeli ................ B62M 6/90
                                                     180/206.1

\* cited by examiner

MULTIPLEXED BATTERY SET AND BATTERY ASSEMBLY HAVING THE MULTIPLEXED BATTERY SET

BACKGROUND OF THE INVENTION

1. Field of the Invention

The present invention relates to battery technology and more particularly, to a multiplexed battery set and a battery assembly having the multiplexed battery set.

2. Description of the Related Art

U.S. Pat. No. 8,881,857 B2 discloses a bicycle frame comprising a tube section having an interior space for receiving one battery unit. Based on the problem of endurance, bicycle batteries usually have a considerable capacity, and therefore the volume also need to be large enough. For the passing of a large volume battery, the opening of the tube section must be large enough. However, making a large opening on the tube section may lead to weakened structural strength. Thus, it is necessary to thicken the wall thickness of the tube section of the bicycle frame or a supplemented reinforcing structure must be provided to enhance the structure of the tube section of the bicycle frame to make the bicycle frame in line with safety regulations. It can be seen that the aforementioned prior art technique has a problem that the vehicle frame has a large opening for the passing of the large volume battery, and the structure of the vehicle frame is weakened due to the creation of the large opening.

European Patent EP 2,134,592 B1 and EP 2,653,371 A1 disclose a bicycle frame with integrated and detachable battery. According to these designs, the bicycle frame is configured to provide an opening for the mounting of a battery module that exposes to the outside of the vehicle frame. This architecture also significantly weakens the structure of the bicycle frame. Further, in these European patents, a gap will be left between the bicycle frame and the battery module due to structural tolerances, leading to structural instability problem when the battery module is mounted.

German Patent DE 10 2010 000 740 A1 discloses a flexible battery module. According to this design, the flexible battery module is mounted around one tube body of a vehicle frame and exposed to the outside, and a hooking device (referenced by 9) is used to secure the flexible battery module firmly to the tube body of the vehicle frame. This design does not affect the structural strength of the vehicle frame. However, it aesthetically impacts the vehicle frame. Further, exposing the flexible battery module needs to consider the weather factor or the waterproof problem in the rain. In order to solve the weather induced and waterproof problems, it needs to consider additional materials and protection mechanism that may increase the cost.

SUMMARY OF THE INVENTION

The present invention has been accomplished under the circumstances in view. It is an object of the present invention to provide a multiplexed battery set, which is formed by connecting a plurality of battery units in series for allowing bending the battery units at different connection positions and thus, the multiplexed battery set can be inserted through an opening that is dimensioned for the passing of one single battery unit into the inside of a spare part to be installed. Thus, the present invention reduces the size requirement of the opening, eliminating the problem of weakened structural strength of the spare part to be installed due to the creation of the opening.

It is another object of the present invention to provide a battery assembly comprising a multiplexed battery set that facilitates mounting and dismounting. The battery assembly is mountable in a vehicle frame that has an opening dimensioned for the passing of one single battery unit. Thus, the multiple battery units of the multiplexed battery set can be inserted through the opening into the inside of the vehicle frame or taken out of the vehicle frame through the opening one by one. Thus, the size requirement of the opening can be minimized, eliminating the problem of weakened structural strength of the vehicle frame due to the creation of the opening.

It is another object of the present invention to provide a battery assembly for electric bicycle, which enhances the battery unit structural stability after installation.

To achieve these and other objects of the present invention, a multiplexed battery set comprises a plurality of battery units and a plurality of electrical wires. The battery units are connected in series in such a manner that the battery units are bendable at connection positions, each of which is between each adjacent two of the battery units. Further, each battery unit comprises a plurality of contacts. The electrical wires are respectively electrically connected between the contacts of each adjacent two battery units to electrically connect the battery units in series. Further, the electrical wires have a length capable for keeping battery units in an electrically connected status when each two adjacent battery units is bent by an external force.

Thus, the multiplexed battery set is formed by connecting a plurality of battery units in series for allowing bending of the battery units at connection positions. The multiple battery units of the multiplexed battery set can be inserted one by one through an opening that is dimensioned for the passing of one single battery unit into the inside of a spare part to be installed. Thus, the present invention reduces the size requirement of the opening, eliminating the problem of weakened structural strength of the spare part to be installed due to the creation of the opening.

To achieve these and other objects of the present invention, a battery assembly comprises battery mounting structure and a battery set. The battery mounting structure comprises a vehicle frame body and a cover. The vehicle frame body comprises a battery mounting chamber defined therein, and an opening located at one side thereof and disposed in communication with the vehicle frame body battery mounting chamber. The cover is capped on the vehicle frame body to enclose the opening. The battery set comprises a plurality of battery units, and a plurality of electrical wires. The battery units are connected in series in such a manner that the battery units are bendable at connection positions, each of which is between each adjacent two said battery units. Further, each battery unit comprises a plurality of contacts. The electrical wires are respectively connected between the contacts of each adjacent two battery units. The battery units are connected in series. The electrical wires have a length capable for keeping the battery units in an electrically connected status when the connection between each adjacent two battery units is bent by an external force. Further, the opening of the vehicle frame body is configured to correspond to the shape of the battery units so that the battery units are insertable through the opening into the battery mounting chamber one by one.

Thus, the size of the opening of the vehicle frame body is made simply for allowing one single battery unit to pass. The battery units of the multiplexed battery set can be mounted in or taken out of the vehicle frame body through the opening one by one. Thus, the present invention reduces the size requirement of the opening, eliminating the problem of weakened structural strength of the spare part to be installed due to the creation of the opening.

Other advantages and features of the present invention will be fully understood by reference to the following specification in conjunction with the accompanying drawings, in which like reference signs denote like components of structure.

DETAILED DESCRIPTION OF THE INVENTION

Figure 1:
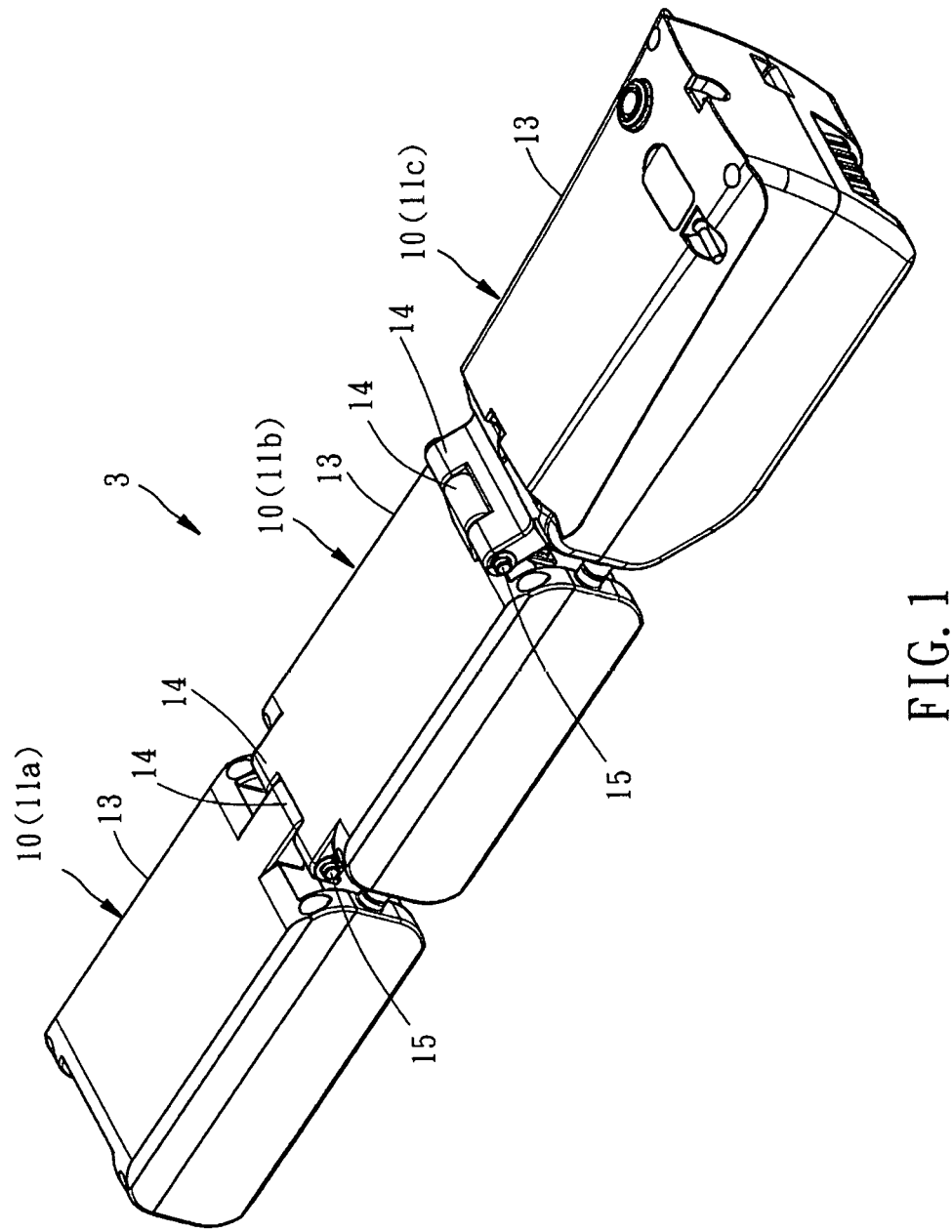
FIG. 1 is an oblique top elevational view of a multiplexed battery set in accordance with a first embodiment of the present invention.

For a detailed description of the utility model of the structure, characteristics and effectiveness now cite the following preferred embodiments accompanied with figures are described below. For facilitating understanding the following embodiments, the same or similar components are denoted as the same reference numerals.

Figure 2:
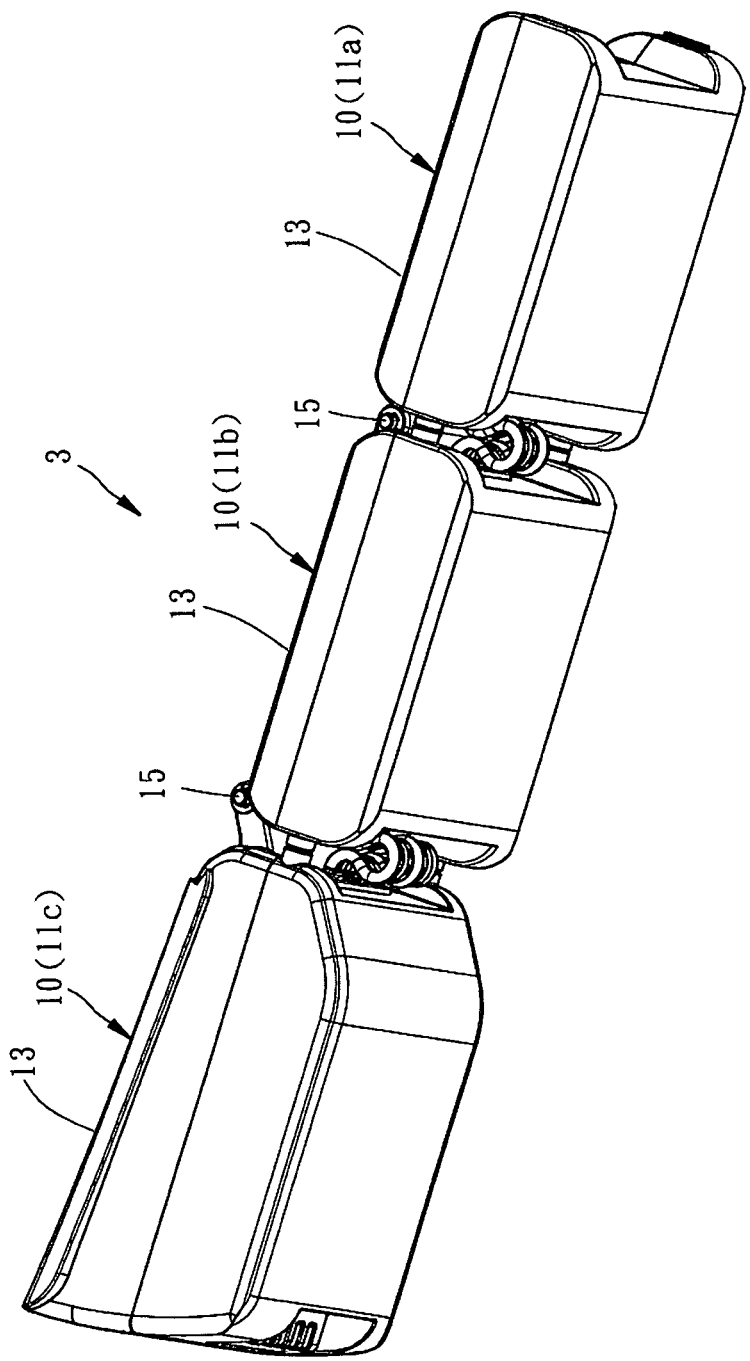
FIG. 2 is an another oblique top elevational view of a multiplexed battery set in accordance with a first embodiment of the present invention, illustrating a bottom surface of the battery set.
Figure 3:
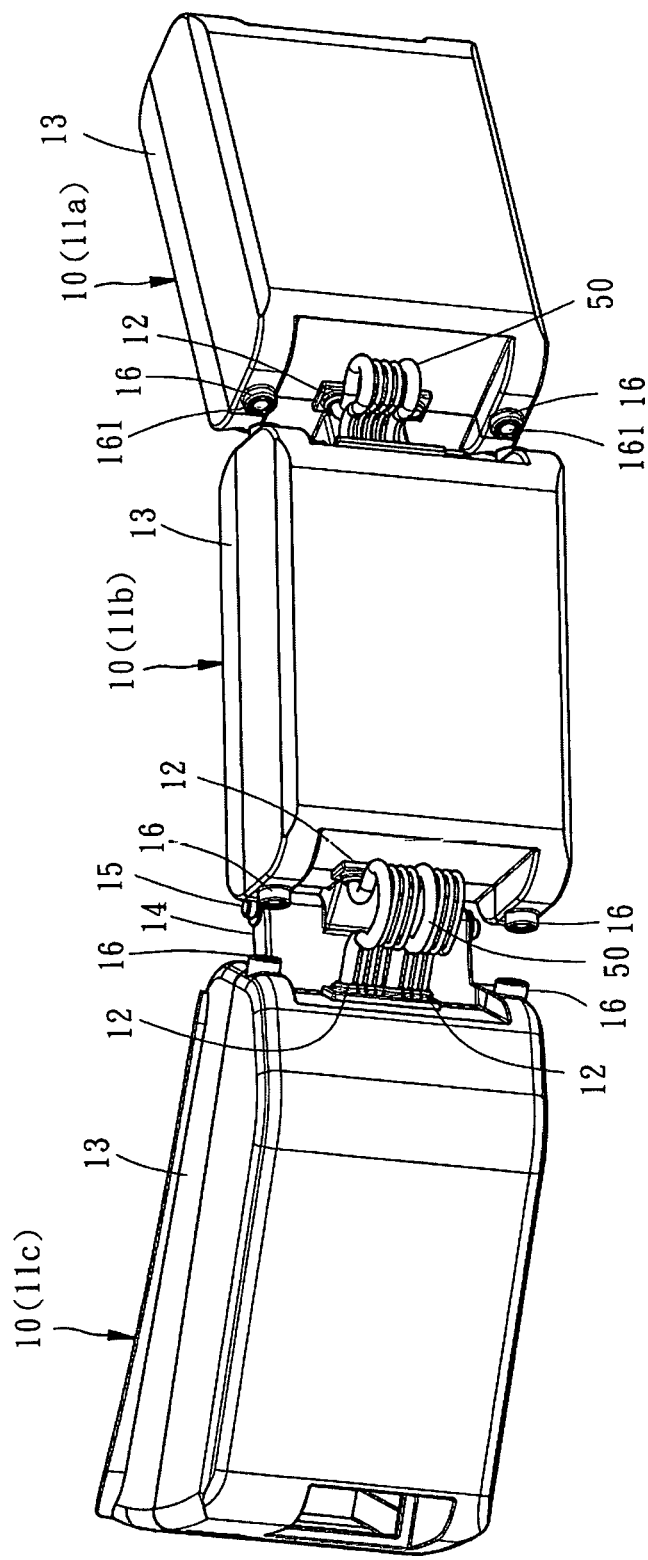
FIG. 3 is another oblique top elevational view of the first embodiment of the present invention, illustrating the battery units are bent.

Referring to FIGS. 1-3, a multiplexed battery set 3 in accordance with a first embodiment of the present invention is shown. The multiplexed battery set 3 comprises a plurality of battery units 10 and a plurality of electrical wires 50.

The battery units 10 are connected in series. Each adjacent two battery units 10 is bendable at connection positions by an external force. Further, each battery unit 10 has a plurality of contacts 12.

The electrical wires 50 are respectively connected between the contacts 12 of each adjacent two battery units 10 to electrically connect the battery units 10 in series. Further, the length of the electrical wires 50 is sufficient to keep the battery units 10 in electric conduction when each adjacent two battery units 10 are bent.

The connection approach of each adjacent two battery units 10 of the first embodiment is based on that the battery units 10 are bendable at connection positions, though it is known that there are alternative connection approaches in the conventional arts. In this first embodiment, each battery unit 10 comprises a battery case 13 and a battery cell (not shown) mounted in the battery case 13. Each battery unit 10 further comprises a connecting arm 14 extended from the battery case 13 toward each adjacent battery unit 10. The connection connecting arms 14 of each two adjacent battery units 10 are pivotally connected together by a pivot 15 at pivotal positions. The pivotal positions are at the aforementioned connection positions respectively. Subject to this pivotable connection relationship, each adjacent two battery units 10 are bendable to each other. Further, each connecting arm 14 is located at one side of the battery case 13 of one respective battery unit 10. These connecting arms 14 are disposed at the same side of the series connection architecture of the battery units 10 so that the battery units 10 can be bent in the same direction.

The battery cases 13 of the battery units 10 can be made in one same size. Alternatively, the battery cases 13 of the battery units 10 can be made in different sizes. In this first embodiment, the battery cases 13 of the battery units 10 have different sizes; in terms of the series combination of the battery units 10, the battery cases 13 of the battery units 10 are arranged in the order of small to large.

It's worth mentioning that in this first embodiment, the battery case 13 of each battery unit 10 further comprises at least one abutment member 16. When the battery cases 13 of each adjacent two battery units 10 are moved toward each other, the at least one abutment member 16 of one battery unit 10 is respectively abutted against one respective abutment member 16 of the other battery unit 10, therefore providing an abutment position. Subject to the arrangement of the abutment members 16, the battery units 10 can be abutted against one another in a straight line. Further, subject to the abutment relationship of the abutment members 16, a certain gap is left between each adjacent two battery units 10, avoiding squeezing of the electrical wires 50 by the battery cases 13 of the battery units 10. Further, in this first embodiment, each abutment member 16 has a magnet 161 mounted therein. When the battery cases 13 of each adjacent two battery units 10 are moved toward each other, the magnet 161 at one battery unit 10 is attracted by the respective magnet 161 at other battery unit 10, providing an additional securing effect to secure each adjacent two of the battery units 10.

As stated above, the multiplexed battery set 3 is formed by connecting a plurality of battery units 10 in series, allowing being bent at the aforementioned connection positions so that the multiplexed battery set 3 can be inserted through an opening that is dimensioned for the passing of one single battery unit 10 into the inside of a spare part to be installed. The opening and the spare part to be installed will be described in the following second embodiment of the present invention in which the spare part to be installed is illustrated in a bicycle frame.

Thus, the size of the opening of the spare part to be installed can be made simply for allowing one single battery unit 10 to pass. It is not necessary to widen the opening to the same size as the entire multiplexed battery set 3 as the implementation of the conventional art technique. Thus, the multiplexed battery set 3 provided by the present invention reduces the size requirement of the opening, eliminating the problem of weakened structural strength of the spare part to be installed due to the creation of the opening.

The method of mounting the multiplexed battery set 3 in the spare part to be installed will be outlined in the following second embodiment.

Referring to FIGS. 4-7, a battery assembly 1 in accordance with a second embodiment of the present invention comprises a multiplexed battery set 3, and a battery mounting structure 5 for easily mounting and dismounting the multiplexed battery set 3. The battery mounting structure 5 comprises a vehicle frame body 21 and a cover 22.

The multiplexed battery set 3 is same as the multiplexed battery set 3 in the aforesaid first embodiment of the present invention.

The vehicle frame body 21 is hollowed inside and comprises a battery mounting chamber 23 therein and an opening 24 located at one side thereof in communication with the battery mounting chamber 23.

The cover 22 is capped on the vehicle frame body 21 to enclose the opening 24.

The opening 24 is shaped to conform to the shape of the battery cases 13 of the battery units 10 for allowing insertion of the battery cases 13 of the battery units 10 one by one.

In this second embodiment of the present invention, the battery cases 13 of the series-connected battery units 10 are arranged in the order of small to large. The opening 24 is shaped to conform to the shape of the largest one of the battery cases 13 of the battery units 10 so that the battery cases 13 of the battery units 10 can be inserted into the opening 24 one by one, and the largest one of battery cases 13 of the battery units 10 is inserted into the opening 24 in the last place.

The configuration of the second embodiment has been described above, and the mounting method of the second embodiment will be described hereinafter.

Figure 4:
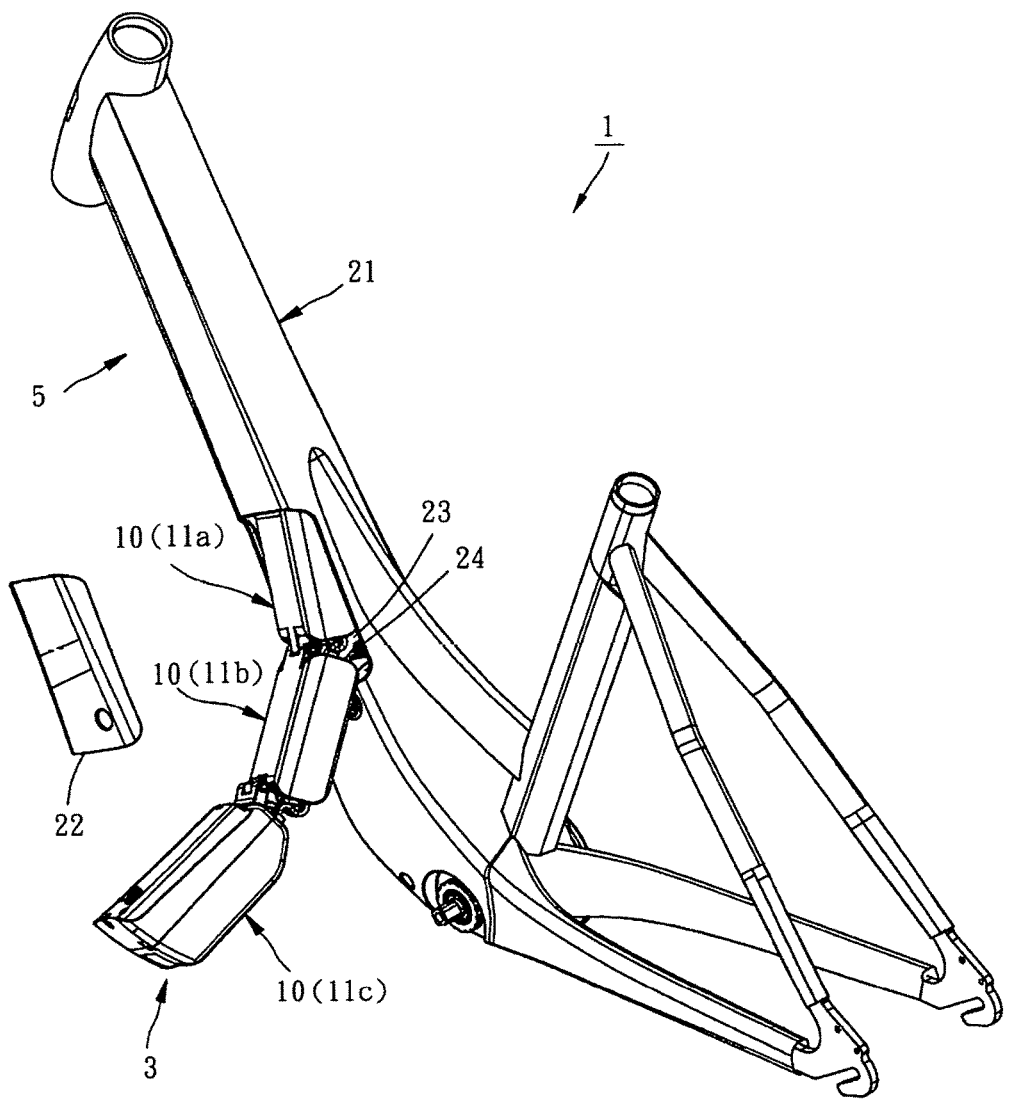
FIG. 4 is a schematic drawing illustrating the structure of a second embodiment of the present invention.
Figure 5:
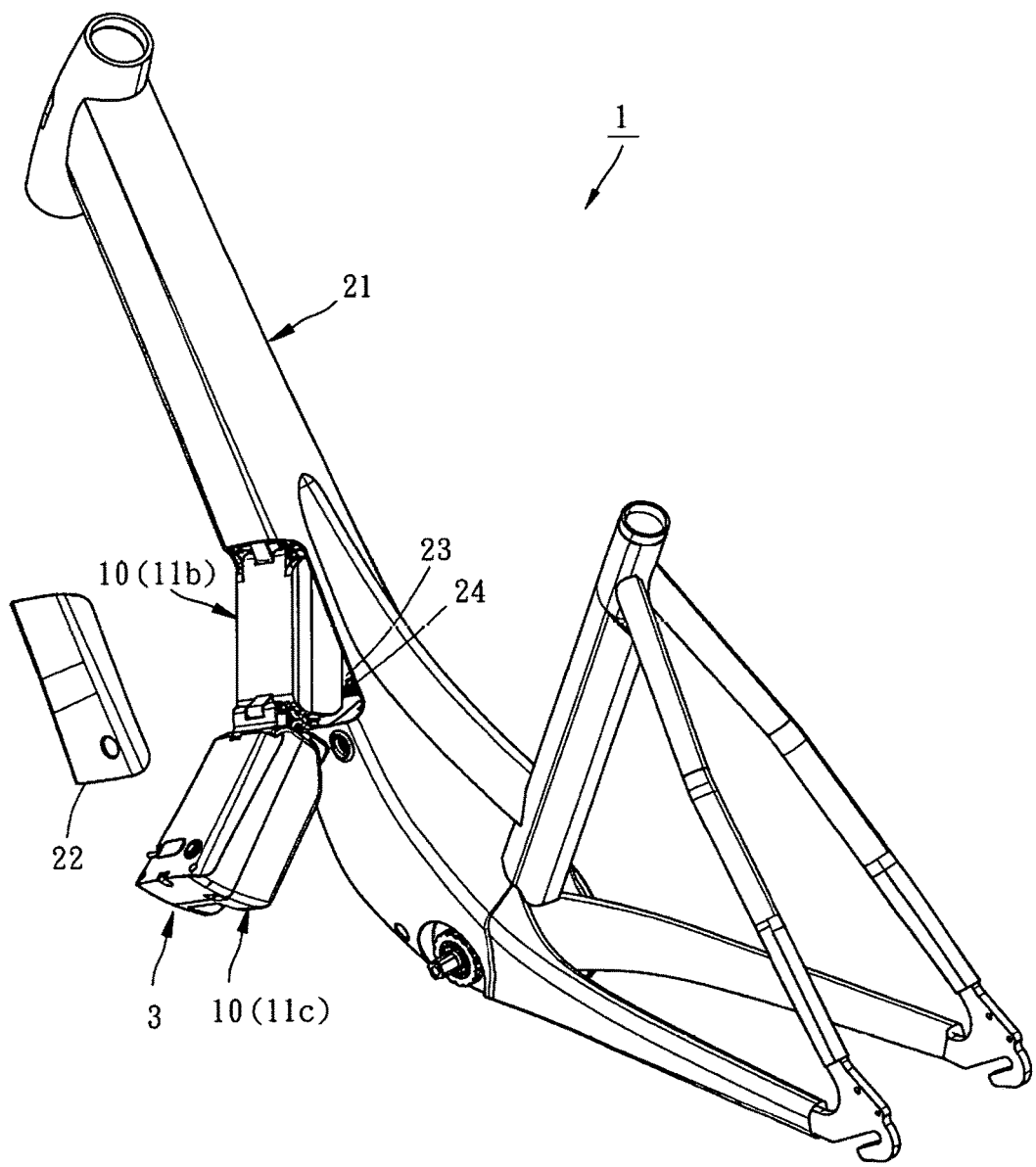
FIG. 5 illustrates a first step of the mounting operation of the second embodiment of the present invention.
Figure 6:
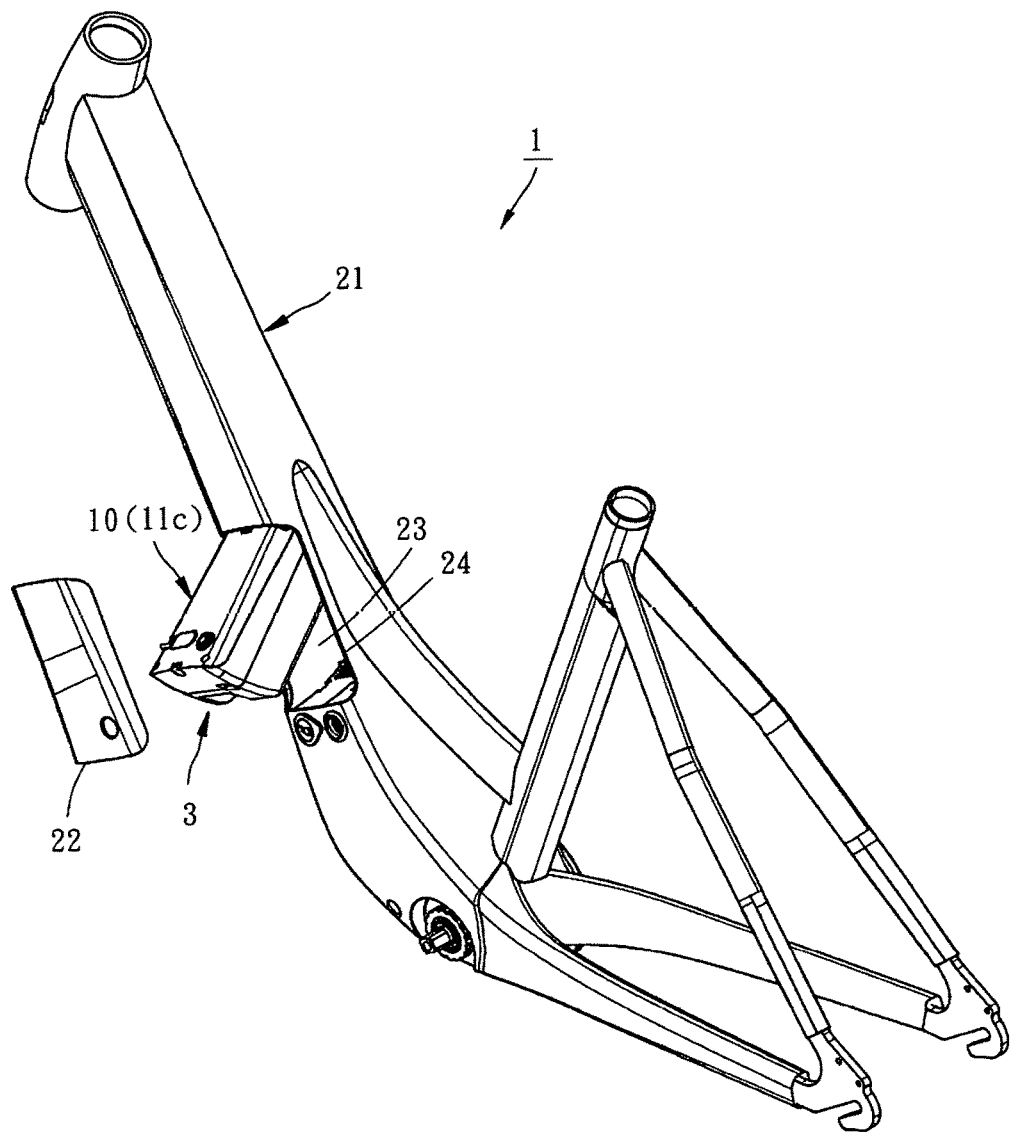
FIG. 6 illustrates a second step of the mounting operation of the second embodiment of the present invention.
Figure 7:
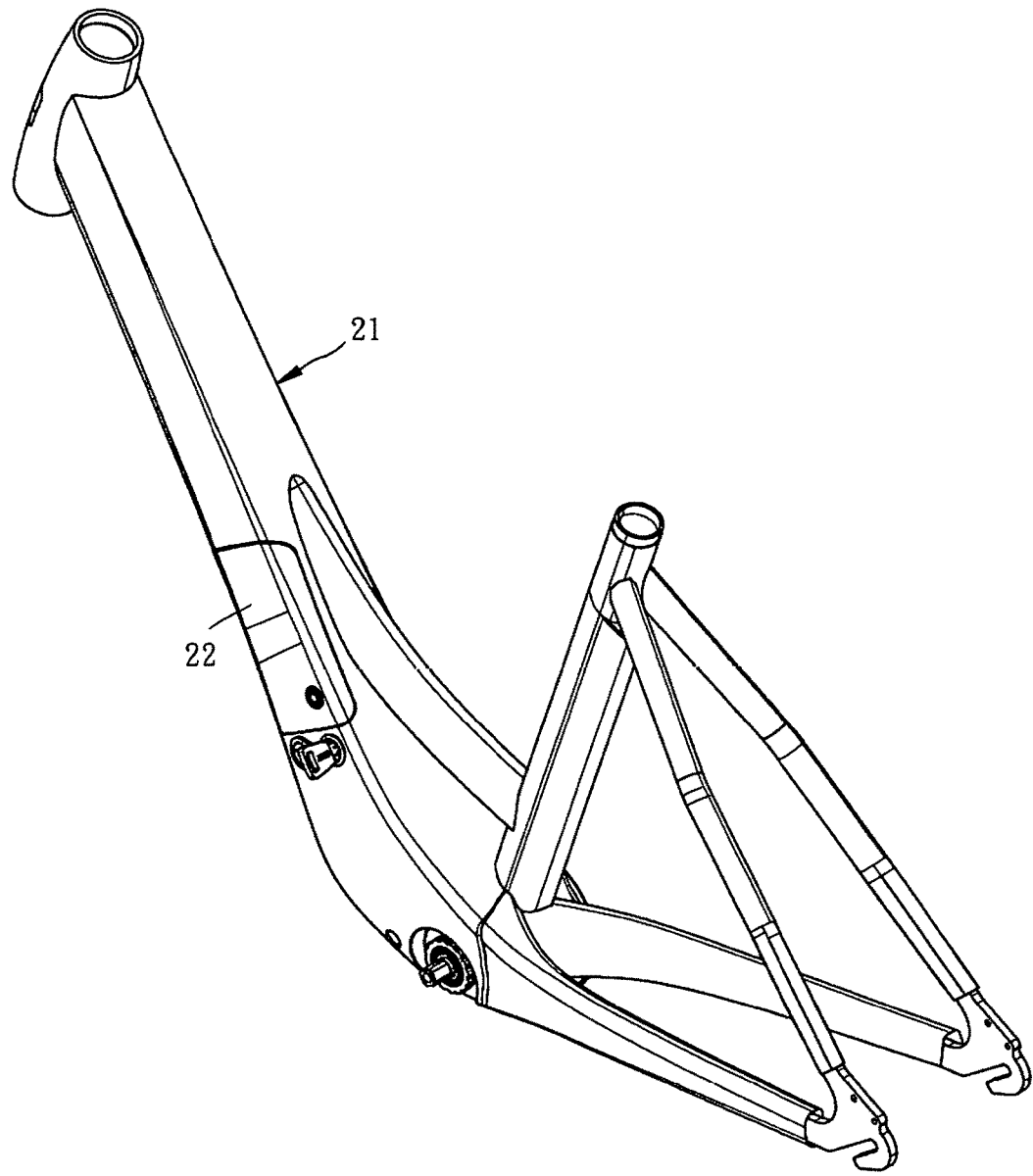
FIG. 7 illustrates a third step of the mounting operation of the second embodiment of the present invention.

Referring to FIGS. 4-7 again, in installation of the second embodiment, insert the multiplexed battery set 3 through the opening 24 of the vehicle frame body 21 into the battery mounting chamber 23, and then cap the cover 22 on the vehicle frame body 21 to enclose the opening 24, thereby completing the installation. It is to be understood that there is a connection interface in the battery mounting chamber 23 to electrically connect with the multiplexed battery set 3 so that the electric energy of the multi-section battery pack 3 can be transmitted. In the installation of the multiplexed battery set 3, as illustrated in FIG. 4, insert the first battery unit 11a (of which the battery case 13 is the smallest) through the opening 24 into the battery mounting chamber 23. At this time, subject to the characteristic that the connection between each two adjacent battery units 10 is bendable, the second and third battery units 11b,11c can be held outside the battery mounting chamber 23 after positioning of the first battery unit 11a in the battery mounting chamber 23. Thereafter, as illustrated in FIG. 5, insert the second battery unit 11b through the opening 24 into the battery mounting chamber 23. At this time, subject to the characteristic that the connection between each adjacent two battery units 10 is bendable, the third battery unit 11c can be held outside the battery mounting chamber 23 after positioning of the first and second battery units 11a, 11b in the battery mounting chamber 23 where the first and second battery units 11a, 11b are firmly secured together in a series subject to magnetic attraction between the magnets 161 of the respective abutment members 16 (see FIG. 3). Thereafter, as illustrated in FIG. 6, insert the third battery unit 11c (of which the battery case 13 is the largest) through the opening 24 into the battery mounting chamber 23, allowing these three battery units 10 to be firmly secured together in the battery mounting chamber 23 by magnetic attraction between the respective magnets 161. At final, as illustrated in FIG. 7, attach the cover 22 to enclose the opening 24, thereby completing the installation procedure.

When wishing to dismount the multiplexed battery set 3, repeat the aforesaid operation in the reversed direction.

It can be seen that the vehicle frame body 21 in accordance with this second embodiment has an opening 24 dimensioned for allowing one single battery unit 10 to pass therethrough and the respective battery units 10 of the multiplexed battery set 3 can be mounted or taken out one by one through the opening 24. Thus, the size requirement of the opening 24 can be minimized, avoiding the problem of weakened structural strength of the vehicle frame body 21 due to the creation of the opening 24.

Figure 8:
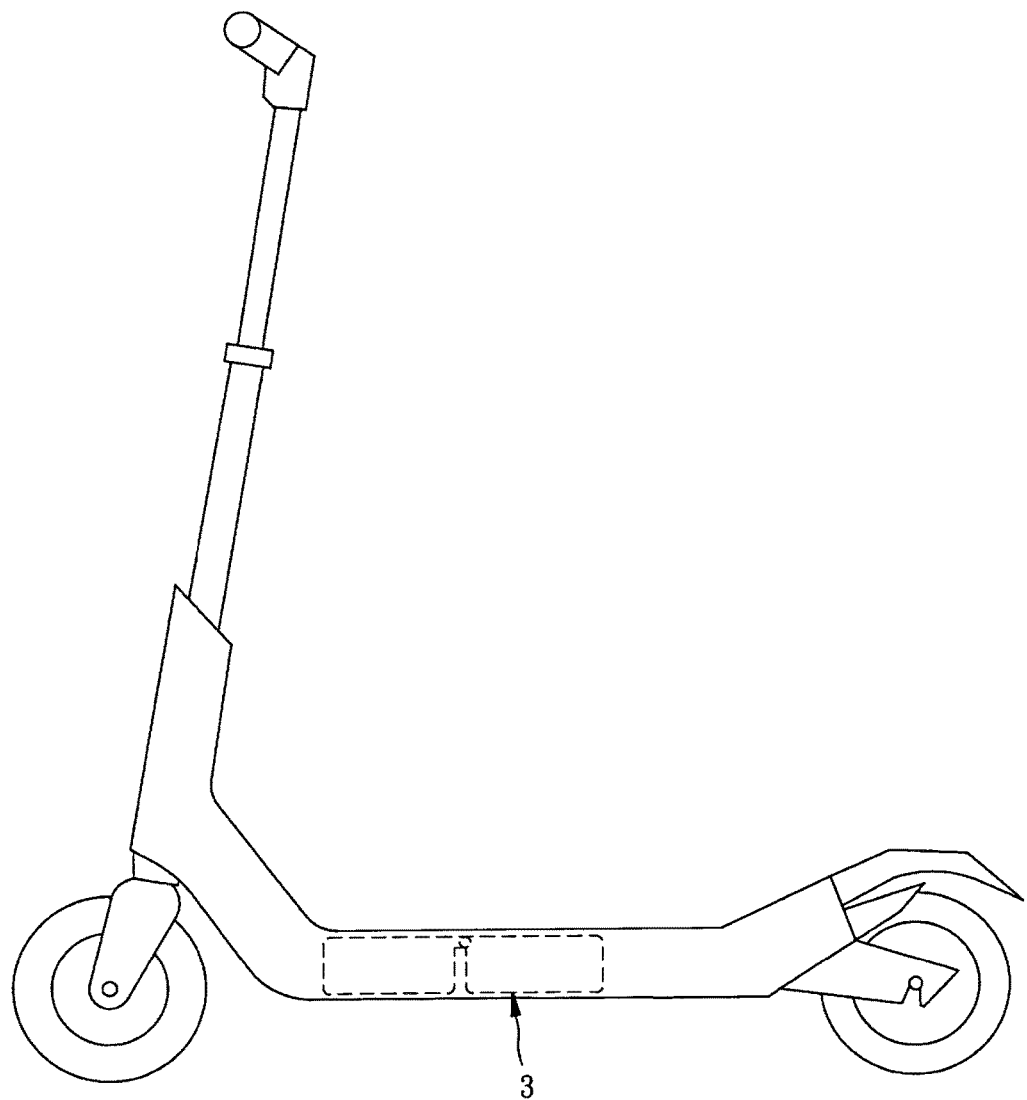
FIG. 8 is a schematic drawing illustrating the second embodiment of the present invention used in an electric scooter
Figure 9:
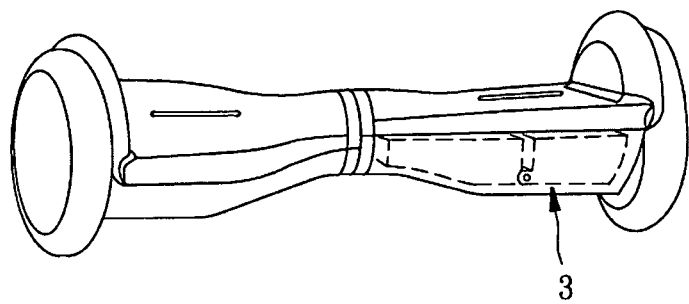
FIG. 9 is a schematic drawing illustrating the second embodiment of the present invention used in a self-balancing vehicle.
Figure 10:
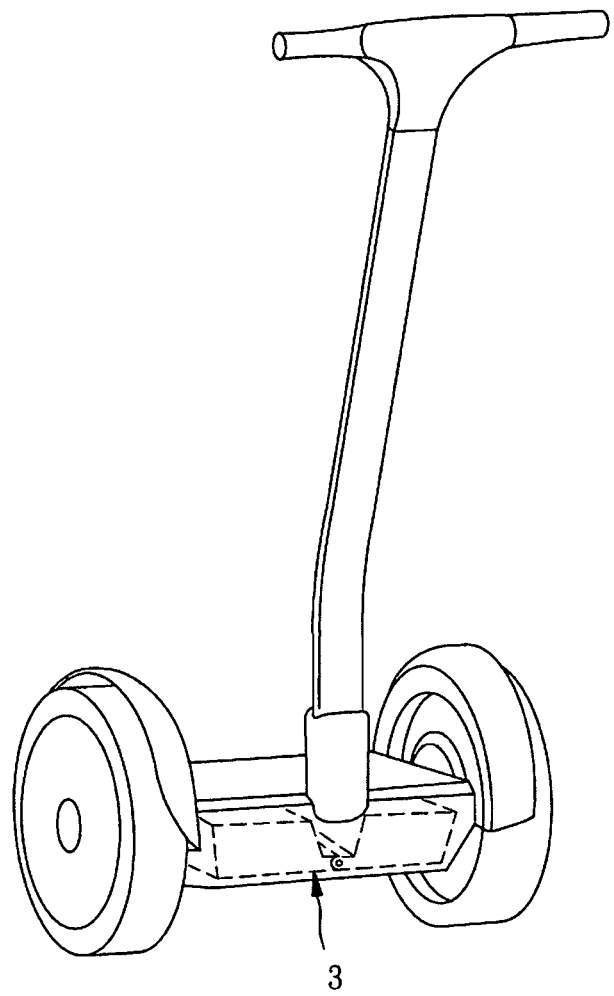
FIG. 10 is a schematic drawing illustrating the second embodiment of the present invention used in an electric scooter.
Figure 11:
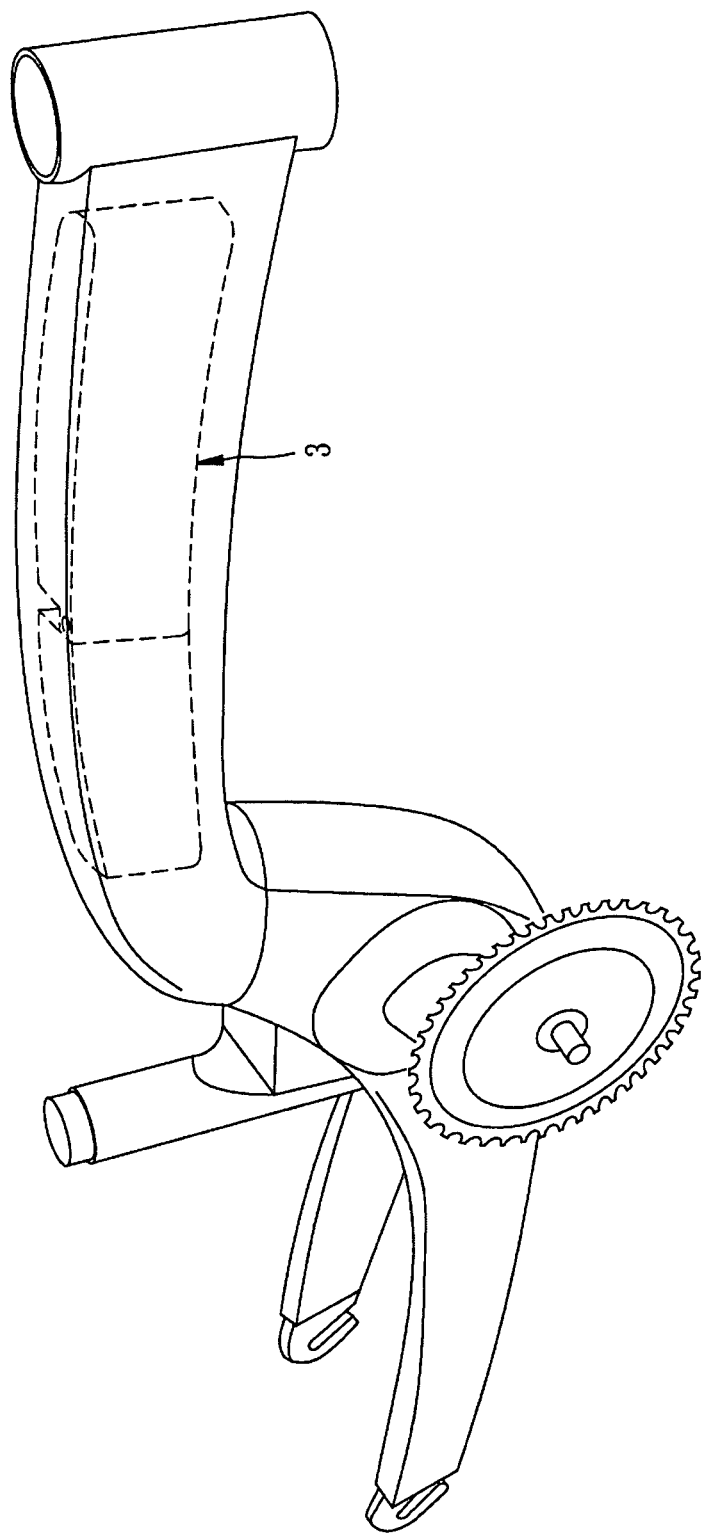
FIG. 11 is a schematic drawing illustrating the second embodiment of the present invention used in a folding type bicycle frame.

It should be noted that in the example shown in FIGS. 4-7, the above-described vehicle frame body 21 is a bicycle frame, however, the technique of the present invention can be applied to a frame of another type of electric vehicle, for example, the electric scooter shown in FIG. 8, the self-balancing vehicle shown in FIG. 9 and FIG. 10, or the folding type bicycle frame shown in FIG. 11. In the above-mentioned drawings, the multiplexed battery set 3 is represented by a dotted line.

Figure 12:
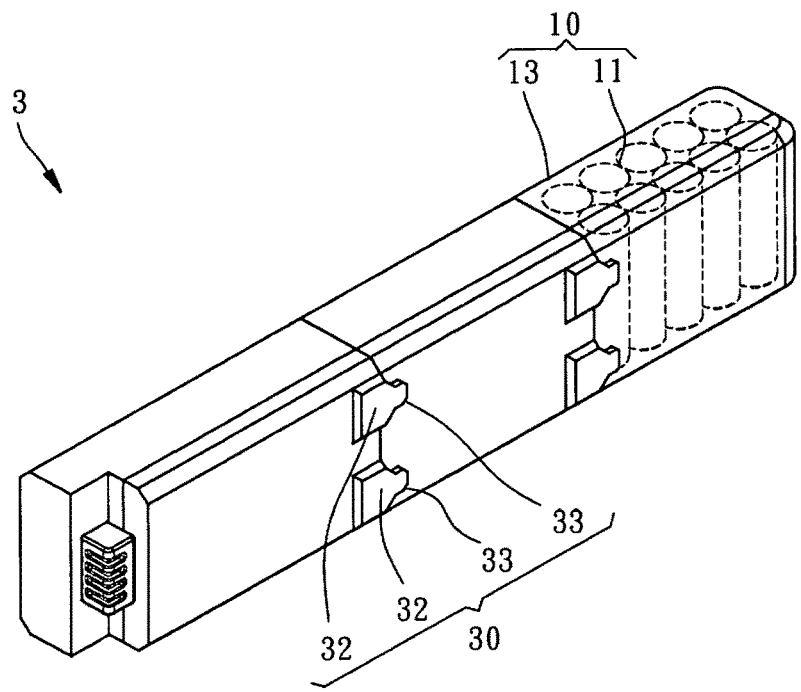
FIG. 12 is a perspective view of a multiplexed battery set in accordance with a third embodiment of the present invention, illustrating the battery cases set in a straight line.
Figure 13:
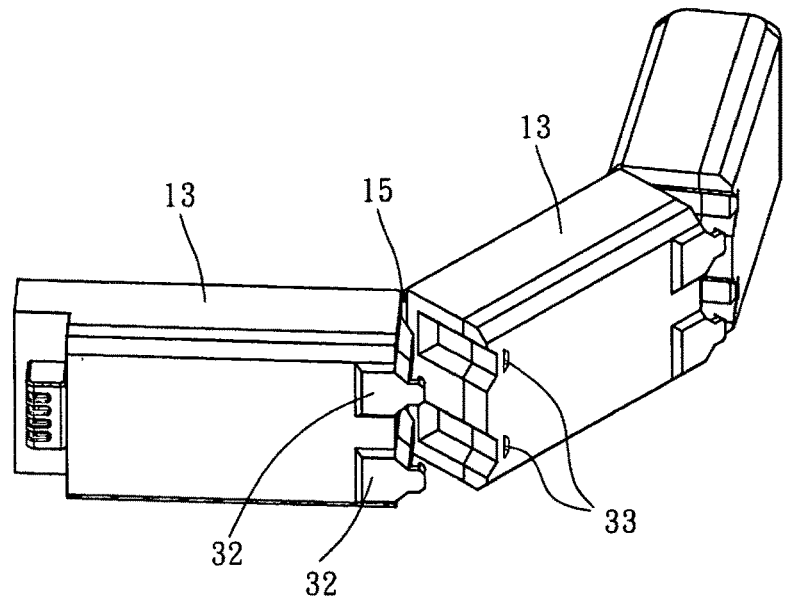
FIG. 13 corresponds to FIG. 12, illustrating the battery bases biased relative to one another.

Referring to FIG. 12 and FIG. 13, a multiplexed battery set 3 in accordance with a third embodiment of the present invention comprises at least two battery units 10 and at least one connector set 30. In this third embodiment, the number of the battery units 10 is three; the number of the connector set 30 is one, however, this arrangement is not a limitation. In actual application, the number of the battery units 10 and the number of the connector sets 30 can be changed according to actual requirements.

The three battery units 10 are arranged side by side, each comprising a battery case 13, and a plurality of battery cells 11 mounted in the battery case 13. The battery cases 13 of each adjacent two battery units 10 are pivotally connected together by a pivot 15 so that each adjacent two battery units 10 is bendable to each other and the battery cells 11 of each adjacent two battery units 10 are electrically coupled together, enabling these three battery units 10 to be electrically connected in series.

Each connector set 30 comprises a first connector 32 and a second connector 33. In this embodiment, the first connector 32 includes two male connector components; the second connector 33 includes two female connector components. The first and second connectors 32, 33 are mounted at the battery cases 13 of each adjacent two battery units 10 at an opposite surface relative to the pivot 15. However, in actual application, only one single male connector component and one single mating female connector component can achieve the desired connection effect.

Figure 14:
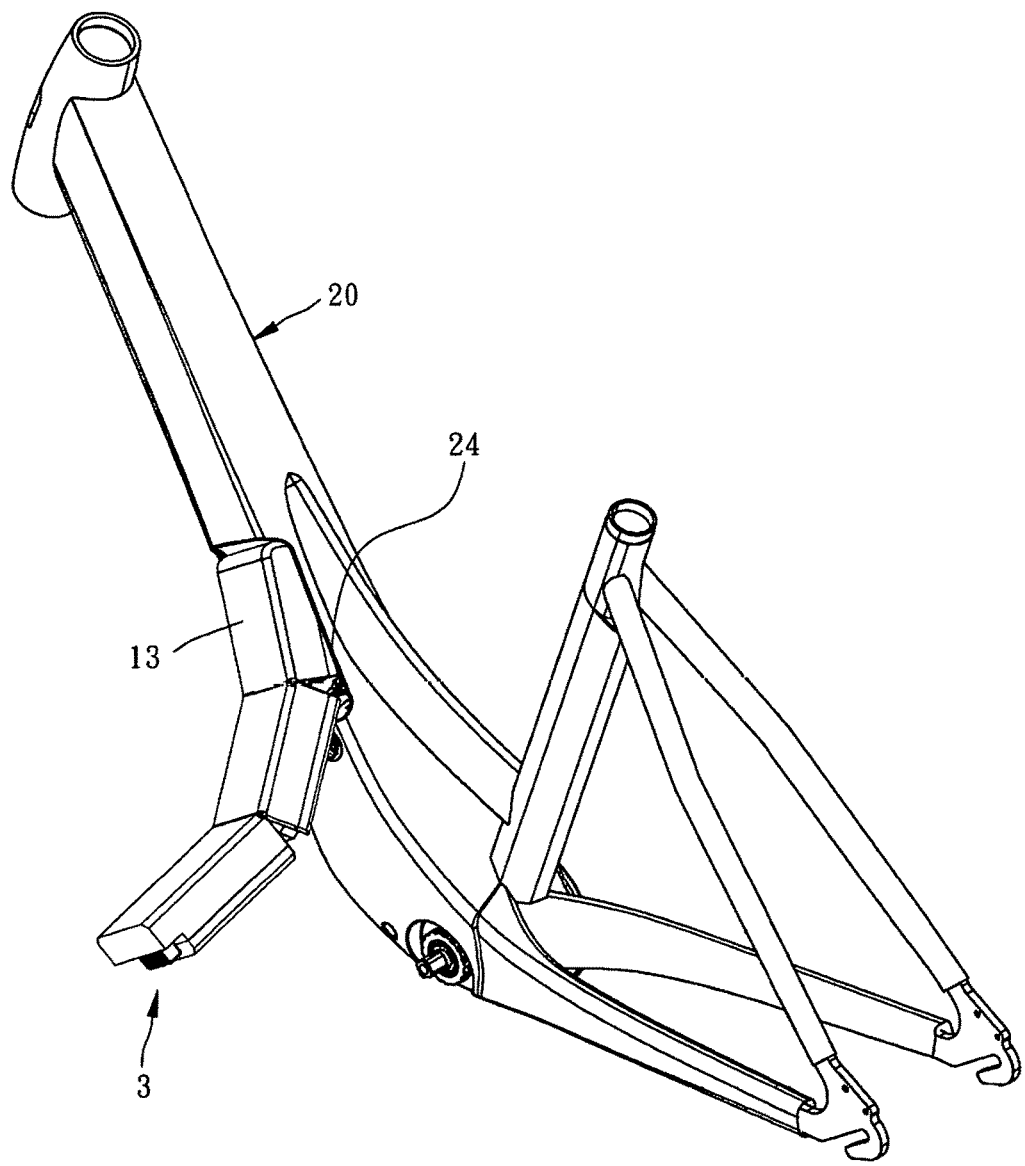
FIG. 14 is an oblique top elevational view illustrating the installation of the multiplexed battery set of the third embodiment in a vehicle frame.

In installation, as illustrated in FIG. 14, subject to the characteristic that the battery cases 13 of each adjacent two battery units 10 is bendable to each other, the multiplexed battery set 3 can be inserted one by one through the opening 24 that is dimensioned for the passing of one single battery unit 10 into the inside of the vehicle frame 20, thus reducing the size requirement of the opening 24 and further eliminating the problem of weakened structural strength of the vehicle frame 20 due to the creation of the opening 24. After installation of the multiplexed battery set 3 into the vehicle frame 20, the battery cases 13 of each adjacent two battery units 10 are abutted against each other end by end. At this time, the first and second connectors 32,33 are forced into connection to secure the battery cases 13 of the respective adjacent two battery units 10 together, and thus, the multiplexed battery set 3 of this third embodiment exhibits a straightly extended state as shown in FIG. 12. Thus, the structural stability of the multiplexed battery set 3 in the vehicle frame 20 is ensured, and vibration of the vehicle frame 20 will not easily affect the electrical connection between each adjacent two battery units 10.

Figure 15:
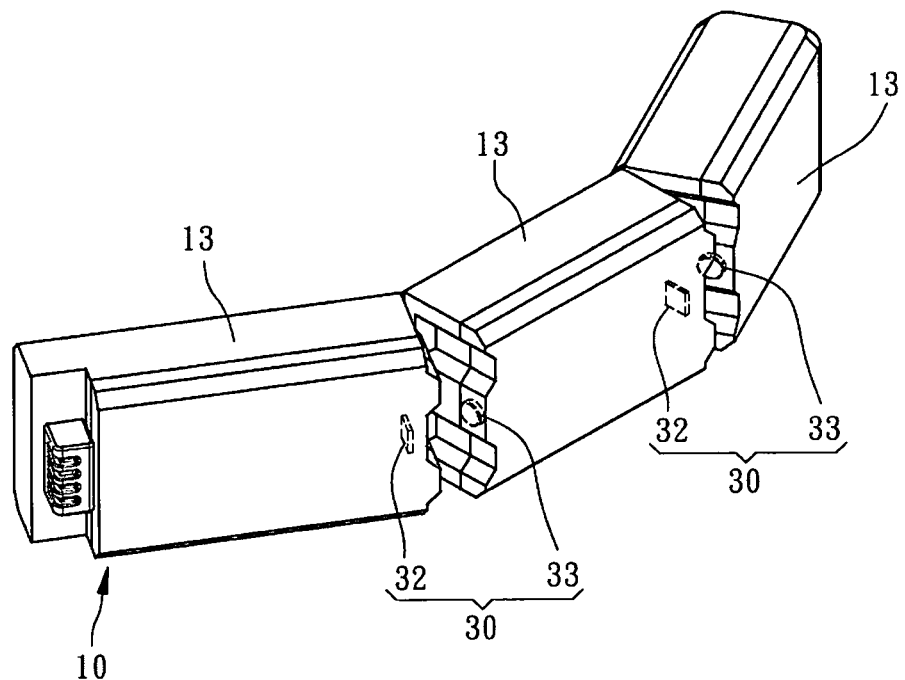
FIG. 15 is an oblique top elevational view of a multiplexed battery set of the third embodiment in accordance with a fourth embodiment of the present invention, illustrating the battery cases biased relative to one another.
Figure 16:
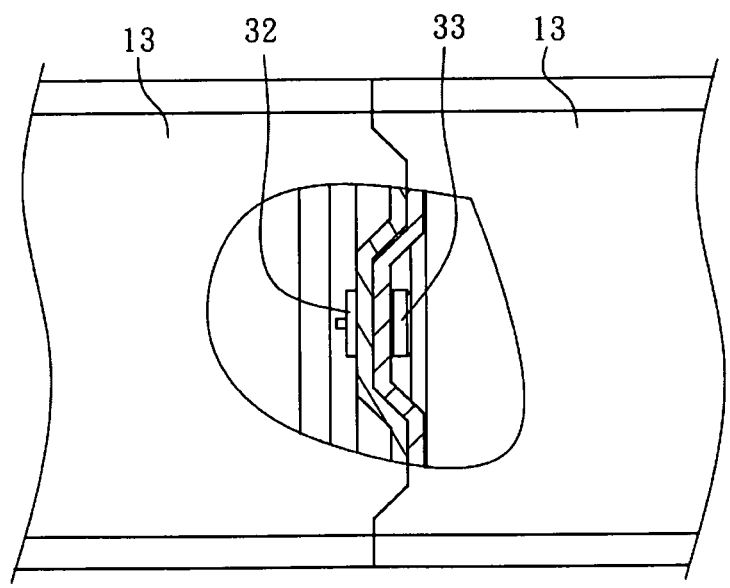
FIG. 16 is a schematic sectional view of a part of the fourth embodiment of the present invention, illustrating the positioning of the first and second connectors.
Figure 17:
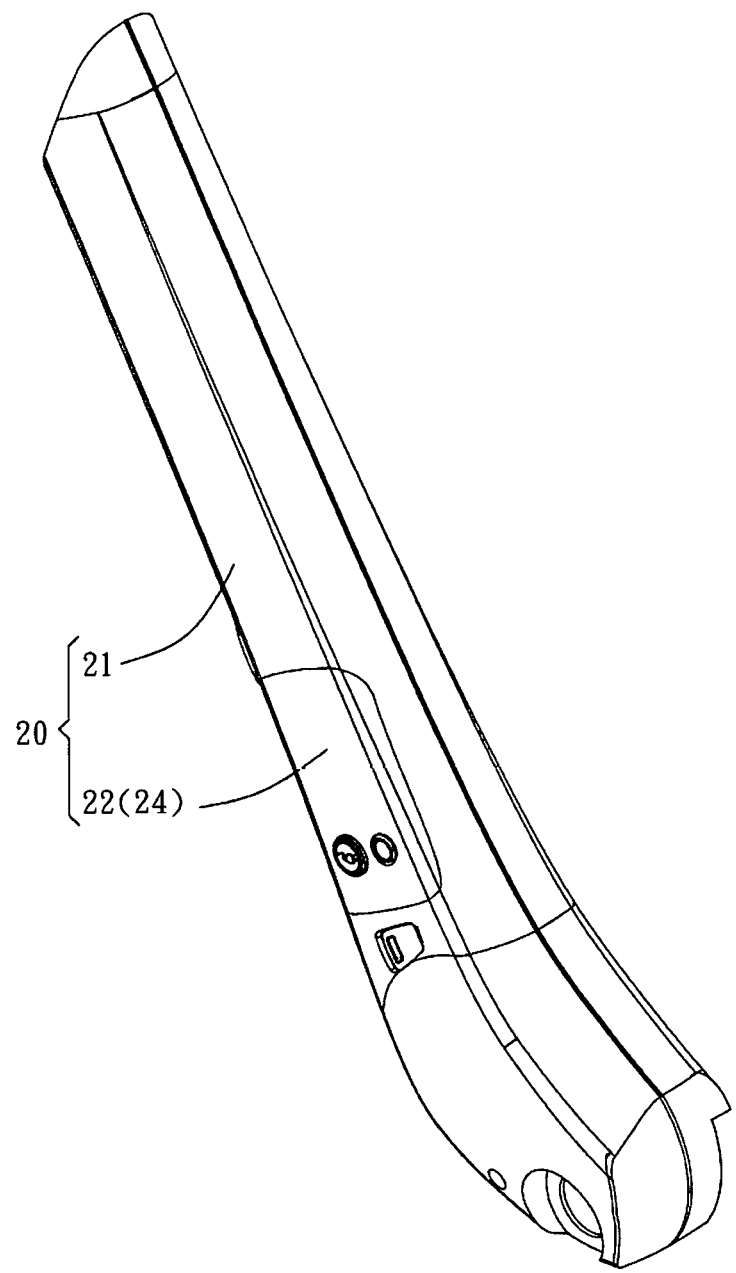
FIG. 17 is an oblique top elevational view of a fifth embodiment of the present invention.
Figure 18:
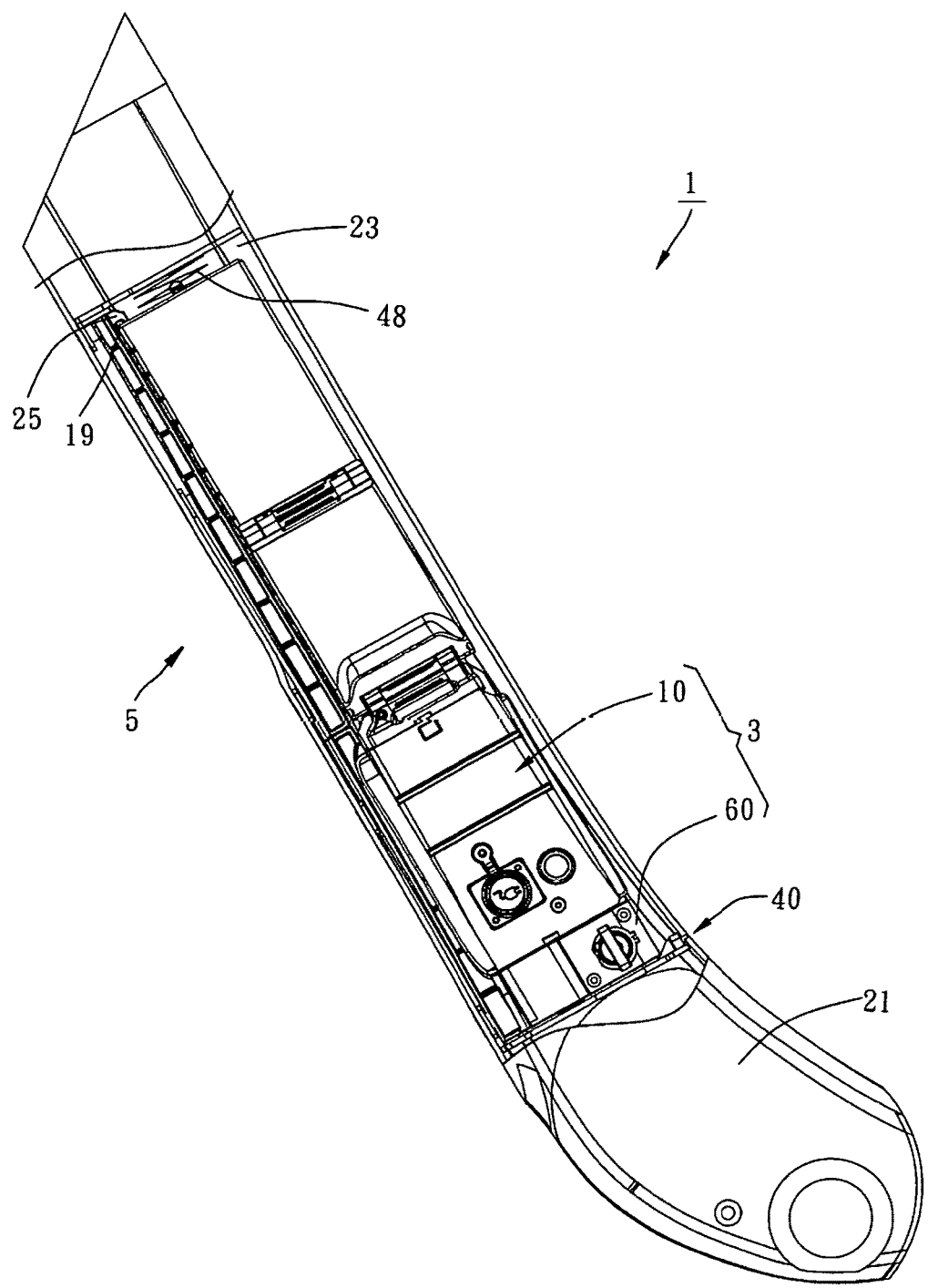
FIG. 18 is a sectional view of a part of the fifth embodiment of the present invention.

On the other hand, the connector set 30 can be differently embodied. As shown in FIGS. 15 and 16, in the fourth embodiment of the present invention, the first and second connectors 32,33 can be magnets having opposite polarities, or one to be a magnet and the other to be a magnetic conductivity material (such as iron plate). In installation, the first and second connectors 32, 33 are respectively mounted in the battery cases 13 of adjacent two battery units 10 and respectively disposed in the respective opposing ends the respective battery cases 13. Thus, after installation the battery set 3 in the vehicle frame 20, the battery cases 13 of each adjacent two battery units 10 are secured together by magnetic attraction between the first and second connectors 32, 33, ensuring structural stability.

Referring to FIGS. 17-21, a battery assembly 1 in accordance with a fifth embodiment of the present invention comprises a multiplexed battery set 3 and a battery mounting structure 5. The battery mounting structure 5 comprises a vehicle frame 20 and a micro-adjustment unit 40.

Figure 19:
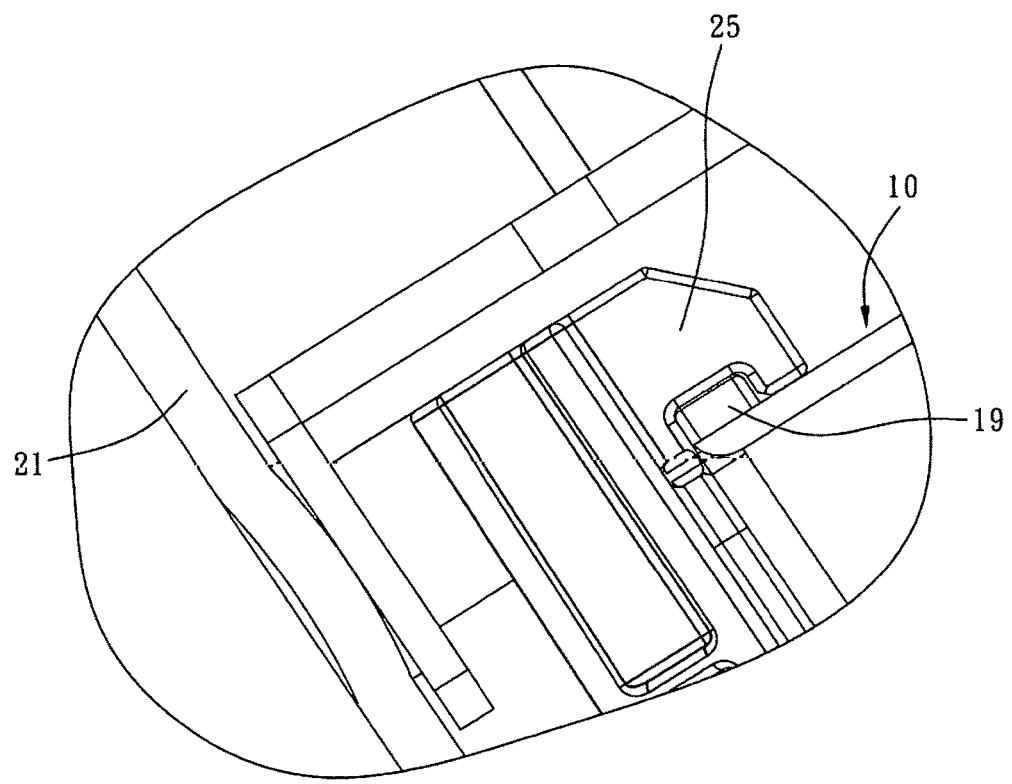
FIG. 19 is an enlarged view of a part of FIG. 18.
Figure 20:
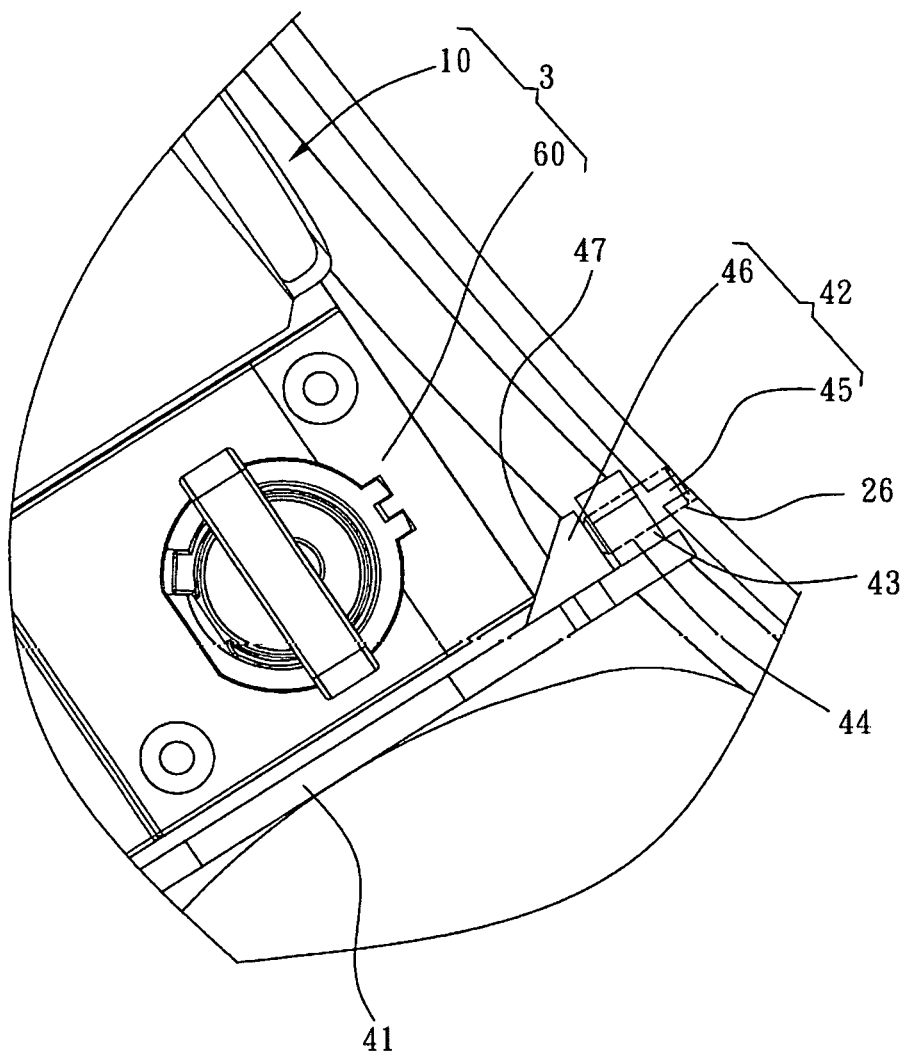
FIG. 20 is an enlarged view of another part of FIG. 18.

The vehicle frame 20 comprises a vehicle frame body 21 and a cover 22. The vehicle frame body 21 comprises a battery mounting chamber 23 defined therein, and an opening 24 located in the surface thereof in communication with the battery mounting chamber 23. The cover 22 is locked to the opening 24 and adapted for enclosing the battery mounting chamber 23. The vehicle frame body 21 further comprises a positioning recess 25 disposed in a front side of the battery mounting chamber 23, as shown in FIG. 19.

The micro-adjustment unit 40 comprises a locating end plate 41 and a micro-adjustment device 42. In this embodiment, the locating end plate 41 is mounted in an opposing rear side of the battery mounting chamber 23 of the vehicle frame body 21, comprising a locating block 43 and a screw hole 44 located in the locating block 43. The micro-adjustment device 42 comprises an adjustment screw 45 and a slider 46. The adjustment screw 45 is threaded into the screw hole 44 of the locating end plate 41 with a bottom end thereof inserted into an adjustment hole 26 in the vehicle frame body 21 and an opposing top end thereof disposed outside the screw hole 44 and pivotally connected to the slider 46. The slider 46 has a beveled surface 47 abutted against a rear end of a battery snap 60. The micro-adjustment unit 40 further comprises a spring member 48. The spring member 48 has one end thereof mounted in the front side of the battery mounting chamber 23, and an opposite end thereof stopped against the front side of the multiplexed battery set 3 to support the multiplexed battery set 3 and to provide a buffer effect to the multiplexed battery set 3.

The multiplexed battery set 3 is mounted in the battery mounting chamber 23 of the vehicle frame body 21, comprising the battery snap 60 and a plurality of battery units 10 that are connected in series to constitute a multiplexed battery. The battery snap 60 is disposed in the rear side of the battery mounting chamber 23. The multiplexed battery of the series of battery units 10 has a rear end thereof detachably connected to the battery snap 60, and an opposing front end thereof provided with a positioning protrusion 19. The positioning protrusion 19 of the multiplexed battery set 3 is engaged into the positioning recess 25 of the vehicle frame body 21, as illustrated in FIG. 19, on the one hand to prohibit the multiplexed battery set 3 from further forward displacement, on the other hand to prevent the multiplexed battery set 3 from jumping during riding the bicycle, increasing structural stability.

Thus, after the installation of the multiplexed battery set 3, a rider can use a hand tool (for example, screwdriver) to rotate the adjustment screw 45. When rotating the adjustment screw 45, the slider 46 will be forced to move toward the battery snap 60, causing the beveled surface 47 to push the battery snap 60 so that the gap between the multiplexed battery set 3 and the battery mounting chamber 23 can be eliminated to enhance the structural stability of the multiplexed battery set 3 and reduce noises generated due to vibration of the multiplexed battery set 3 by an external force.

Figure 21:
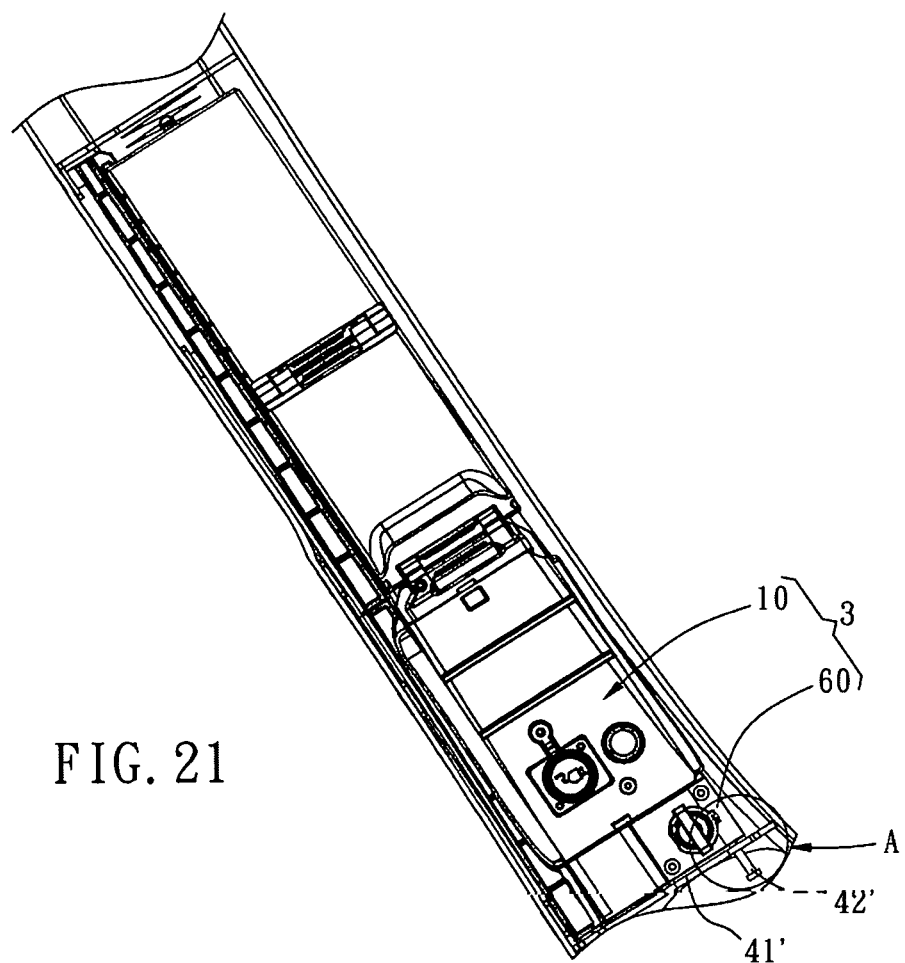
FIG. 21 is a sectional view of a part of a sixth embodiment of the present invention.
Figure 22:
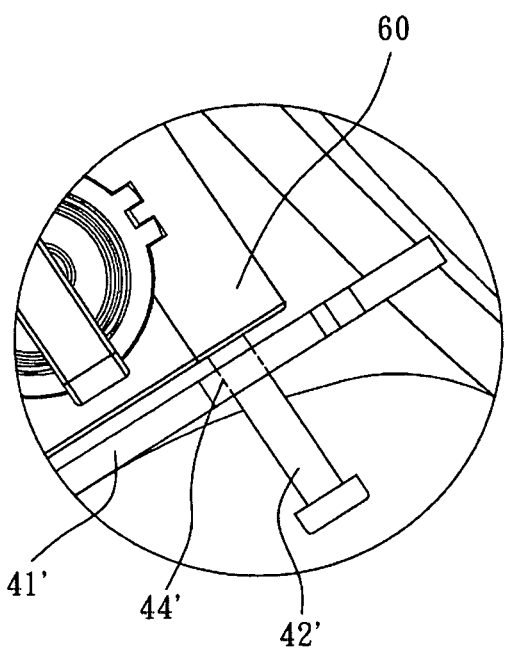
FIG. 22 is an enlarged view of Part A of FIG. 21.
Figure 23:
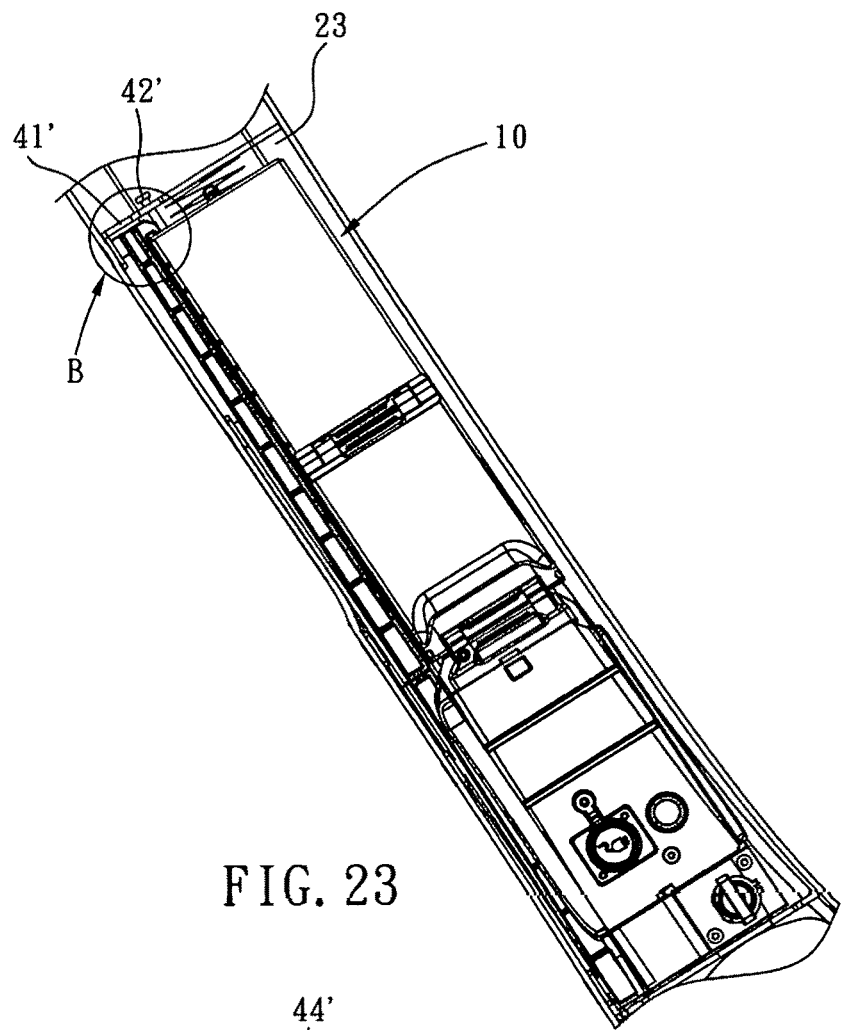
FIG. 23 is a sectional view of a part of a seventh embodiment of the present invention.
Figure 24:
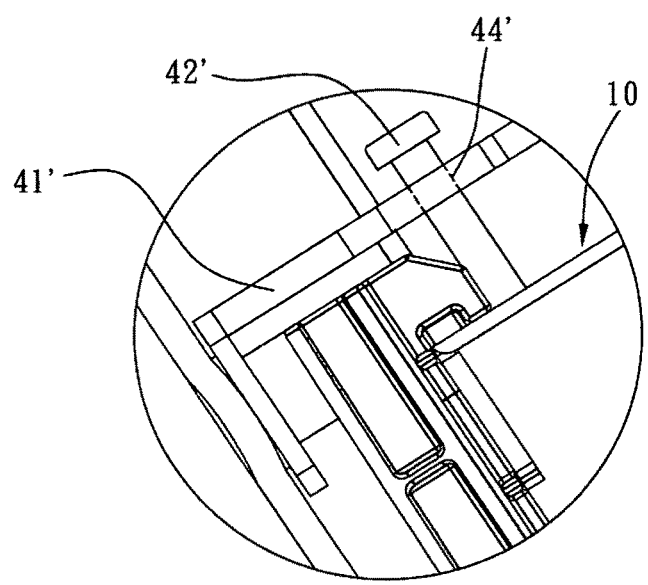
FIG. 24 is an enlarged view of Part B of FIG. 23.

Referring to FIGS. 21 and 22, in a sixth embodiment of the present invention, the locating end plate 41' comprises a screw hole 44' cut through opposing front and back sides thereof; the micro-adjustment device 42' is a screw bolt threaded into the screw hole 44' and stopped with the distal end thereof against the rear side of the battery snap 60. Thus, rotating the micro-adjustment device 42' can adjust the forward-backward position of the multiplexed battery set 3 to achieve gap compensation. In a seventh embodiment of the present invention shown in FIGS. 23 and 24, the mounting position of the locating end plate 41' is changed. As illustrated, the locating end plate 41' is mounted in the front side of the battery mounting chamber 23; the distal end of the micro-adjustment device 42' is stopped against the front end of the multiplexed battery set 3. Thus, rotating the micro-adjustment device 42' can achieve the same effect of gap compensation as the aforesaid second embodiment.

In conclusion, the battery assembly 1 provides a micro-adjustment device 42,42' in the vehicle frame 20 for adjustment of the forward-backward position of the multiplexed battery set 3 in the vehicle frame 20 to compensate the gap between the multiplexed battery set 3 and the vehicle frame 20 after mounting, achieving the objects of the present invention.

What is claimed is:

1. A multiplexed battery assembly, comprising
a battery mounting structure comprising a vehicle frame body and a cover, said vehicle frame body comprising a battery mounting chamber defined therein and an opening located at one side thereof and disposed in communication with said battery mounting chamber, said cover being capped on said vehicle frame body to enclose said opening; and
a battery set comprising a plurality of battery units and a plurality of electrical wires, said battery units being connected in series in such a manner that said battery units are bendable at connection positions, each of which is between each adjacent two said battery units, each said battery unit comprising a plurality of contacts, said electrical wires being respectively connected between said contacts of each adjacent two said battery units;
wherein said battery units are connected in series; said electrical wires have a length capable for keeping said battery units in an electrically connected status when each adjacent two said battery units is bent by an external force; said opening is configured to correspond to the shape of said battery units so that said battery units are insertable through said opening one by one;
wherein the multiplexed battery assembly further comprises a micro-adjustment unit; said micro-adjustment unit comprises a locating end late and a micro-adjustment device; said battery set is mounted in said battery mounting chamber of said vehicle frame body; said locating end plate is mounted in said battery mounting chamber of said vehicle frame body at one end of said battery set; said micro-adjustment device is mounted at said locating end plate and movable relative to said battery set and abutted against one end of said batter; and
wherein said battery set further comprises a battery snap; said battery units are combined to form a multiplexed battery, said multiplexed battery has one end thereof detachably connected to said battery snap; said locating end plate comprises a locating block facing toward one side of said battery set and a screw hole locating on said locating block; said micro-adjustment device comprises an adjustment screw and a slider; said adjustment screw is threaded into said screw hole of said locating end plate; said slider is pivotally connected to one end of said adjustment screw; said slider comprises a beveled surface abutted against one end of said battery snap.

2. A multiplexed battery assembly, comprising
a battery mounting structure comprising a vehicle frame body and a cover, said vehicle frame body comprising a battery mounting chamber defined therein and an opening located at one side thereof and disposed in communication with said battery mounting chamber, said cover being capped on said vehicle frame body to enclose said opening; and
a battery set comprising a plurality of battery units and a plurality of electrical wires, said battery units being connected in series in such a manner that said battery units are bendable at connection positions, each of which is between each adjacent two said battery units, each said battery unit comprising a plurality of contacts, said electrical wires being respectively connected between said contacts of each adjacent two said battery units;
wherein said battery units are connected in series; said electrical wires have a length capable for keeping said battery units in an electrically connected status when each adjacent two said battery units is bent by an external force; said opening is configured to correspond to the shape of said battery units so that said battery units are insertable through said opening one by one;
wherein the multiplexed battery assembly further comprising a micro-adjustment unit; said micro-adjustment unit comprises a locating end plate and a micro-adjustment device; said batter set is mounted in said battery mounting chamber of said vehicle frame body; said locating end plate is mounted in said battery mounting chamber of said vehicle frame body at one end of said battery set; said micro-adjustment device is mounted at said locating end plate and movable relative to said battery set and abutted against one end of said battery set; and
wherein said battery set further comprises a battery snap; said battery units are combined to form a multiplexed battery; said multiplexed battery has one end thereof detachably connected to said battery snap; said locating end plate comprises a screw hole; said micro-adjustment device is a screw bolt threaded into said screw hole of said locating end plate and abutted against one end of said battery snap remote from said multiplexed battery.

* * * * *